(12) United States Patent
Lie

(10) Patent No.: US 9,734,081 B2
(45) Date of Patent: Aug. 15, 2017

(54) THIN PROVISIONING ARCHITECTURE FOR HIGH SEEK-TIME DEVICES

(71) Applicant: Advanced Micro Devices, Inc., Sunnyvale, CA (US)

(72) Inventor: Sean Lie, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 208 days.

(21) Appl. No.: 14/565,584

(22) Filed: Dec. 10, 2014

(65) Prior Publication Data

US 2015/0331807 A1 Nov. 19, 2015

(51) Int. Cl.
*G06F 12/00* (2006.01)
*G06F 12/1009* (2016.01)
*G06F 12/1045* (2016.01)

(52) U.S. Cl.
CPC ...... *G06F 12/1009* (2013.01); *G06F 12/1063* (2013.01); *G06F 2212/1021* (2013.01); *G06F 2212/65* (2013.01)

(58) Field of Classification Search
None
See application file for complete search history.

(56) References Cited

U.S. PATENT DOCUMENTS

| | | | | |
|---|---|---|---|---|
| 5,652,857 A * | 7/1997 | Shimoi | ............... | G06F 3/0601 710/68 |
| 6,115,793 A * | 9/2000 | Gruber | ............... | G06F 12/0864 711/133 |
| 2004/0065744 A1* | 4/2004 | Shiraishi | ............ | G11C 16/3418 235/492 |
| 2004/0123068 A1* | 6/2004 | Hashimoto | ......... | G06F 12/0866 711/206 |
| 2006/0010293 A1* | 1/2006 | Schnapp | ............. | G06F 12/0804 711/119 |
| 2007/0067593 A1* | 3/2007 | Satoyama | ............. | G06F 3/0613 711/165 |
| 2007/0150654 A1* | 6/2007 | Shin | .................... | G06F 12/0246 711/118 |
| 2011/0029713 A1* | 2/2011 | Wade | .................... | G06F 3/0608 711/6 |

(Continued)

OTHER PUBLICATIONS

"3PAR Utility Storage with VMware vSphere", Hewlett-Packard Development Company, L.P., Technical White Paper, May 1, 2011, 19 pages.

*Primary Examiner* — Yong Choe
*Assistant Examiner* — Tasnima Matin

(57) ABSTRACT

A compute server accomplishes physical address to virtual address translation to optimize physical storage capacity via thin provisioning techniques. The thin provisioning techniques can minimize disk seeks during command functions by utilizing a translation table and free list stored to both one or more physical storage devices as well as to a cache. The cached translation table and free list can be updated directly in response to disk write procedures. A read-only copy of the cached translation table and free list can be created and stored to physical storage device for use in building the cached translation table and free list upon a boot of the compute server. The copy may also be used to repair the cached translation table in the event of a power failure or other event affecting the cache.

20 Claims, 12 Drawing Sheets

(56) References Cited

U.S. PATENT DOCUMENTS

| | | | |
|---|---|---|---|
| 2012/0054419 A1* | 3/2012 | Chen | G06F 11/1441 |
| | | | 711/103 |
| 2014/0229943 A1* | 8/2014 | Tian | G06F 9/45533 |
| | | | 718/1 |
| 2014/0379991 A1* | 12/2014 | Lomet | G06F 12/0891 |
| | | | 711/135 |
| 2015/0331807 A1* | 11/2015 | Lie | G06F 12/1009 |
| | | | 711/118 |

* cited by examiner

THIN PROVISIONING ARCHITECTURE FOR HIGH SEEK-TIME DEVICES

BACKGROUND

Field of the Disclosure

The present disclosure relates generally to processing systems and more particularly to a thin provisioning architecture for virtual address to physical address translation.

Description of the Related Art

In a shared storage environment, thin provisioning is a method for optimizing allocation of available storage by employing on-demand storage of blocks of data in order to enable over-allocation of available physical resources. Thus, in a system configured to utilize thin provisioning, the total virtual memory exceeds the storage capacity of one or more physical storage devices of the system. Reading and writing functions in such a system require translation between a virtual address associated with a block of data and a physical address containing the data.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF PREFERRED EMBODIMENTS

Figure 1:
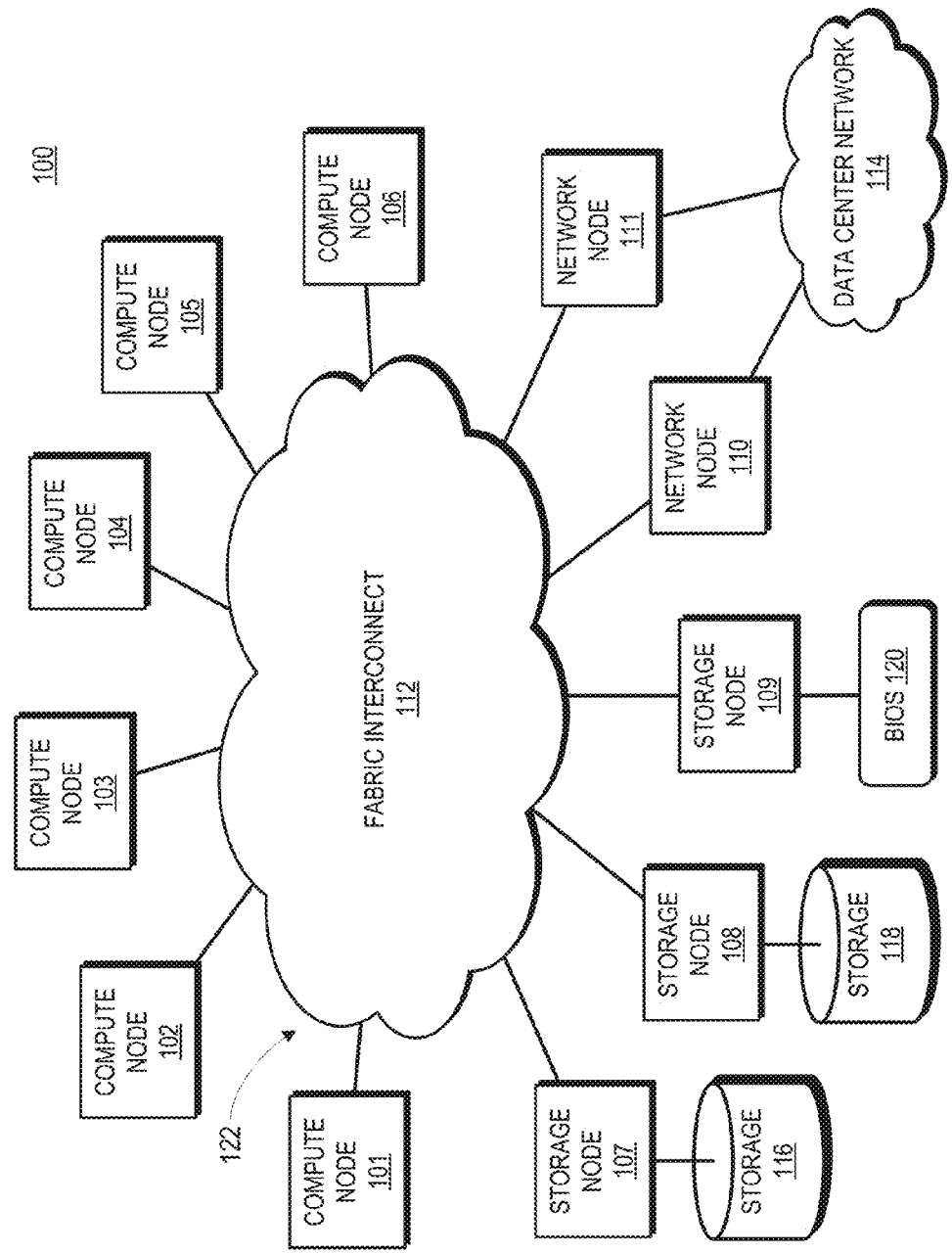
FIG. 1 is a block diagram of a cluster compute server in accordance with some embodiments.

FIGS. 1-13 illustrate example systems and techniques for thin provisioning to optimize utilization of available physical storage device storage capacity through use of virtual storage addresses. For ease of illustration, these techniques are described in the example context of a cluster compute server. The cluster compute server can include three layers for translation of a virtual address (VA) to a physical storage address (PA) in order to execute disk read/write commands received by the compute server. These layers can include a virtualization layer, a thin provisioning layer and a Redundant Array of Independent Disks (RAID) layer. Each layer can accomplish translation of a VA to a PA via a central processing unit (CPU), memory and controllers operably connected to physical storage devices. The CPU, memory and controllers may be contained within a single node or a combination of nodes within the compute server. The translation layers may also utilize a dynamic table containing the mapping of VAs to PAs (herein referred to as a "translation table") and a First-In, First-Out (FIFO) list of PAs which have not been mapped to a VA (herein referred to as a "free list"). The translation table and free list are stored at the hard disk drives, optical disk drives, or other high-seek-time physical storage devices associated with the compute server and a copy of each may also be stored to cache memory to reduce the number of physical disk seeks required for a read/write function.

During a read or write function, the cached translation table can be read and modified to avoid accessing the translation table stored to physical storage device. For either a read or write call, the cached translation table is initially read to obtain the VA to PA mapping for the requested VA.

As a result of a read call in which the VA requested has been mapped, the data stored on the physical storage device at the corresponding PA is returned. If the VA requested has not been mapped, zero data is returned as there is no PA associated with the requested VA. No changes are made to the translation table or to the free list as a result of a physical storage device read procedure.

As a result of a write call in which the VA requested has been mapped, the data is written to the physical storage device at the PA mapped to the requested VA. No changes are made to the translation table as no changes in the VA to PA mapping have occurred. If the requested VA has not been mapped, the cached free list is read to obtain an available PA. Upon mapping the available PA to the requested VA and writing the data to the obtained PA, the cached free list and translation table are updated to reflect the mapping. The PA block located at the physical storage device is updated with metadata containing the VA at the same time the data is written to the PA. The combination of PA blocks and metadata stored in physical storage device is herein referred to as a "physical table".

In order to initially build a translation table, a fixed size for blocks of data to be stored in physical storage device associated with the compute server is first established. The size of the block may be determined based on optimizing free space efficiency and reasonable worst-case fragmented performance for the system while providing for a relatively small translation table containing VA to PA mapping. Once a suitable block size is established, an empty or blank translation table is generated and stored in the non-volatile physical storage device of the system, such as a disk drive within a disk pool. In order to further minimize physical storage device seeks during disk read/write procedures, the translation table may be distributed along with the data in the physical storage device. Thus, metadata containing the mapped VA is stored with the data for each PA block. This allows for updating the translation table at the physical storage device at the same time data is written to the physical storage device without an additional seek.

The translation table is also stored to cache memory along with the corresponding free list of available PAs. On a clean boot, the cached version of the translation table and free list may be built from the translation table stored in the physical storage device. However, because of the high seek time involved in reading the metadata associated with the translation table stored in the physical storage device, a read-only copy, or "snapshot", of the translation table and free list can also be stored in the physical storage device. The snapshot may be utilized in creating the cached version of the translation table and free list when performing a clean boot. The snapshot can also be utilized to repair the cached translation table and free list in the event of an unexpected power failure or system shut down.

The snapshot of the cached translation table may be taken periodically while the system is powered on and prior to a power shutdown. Each snapshot is atomic and replaces the previous snapshot. Thus, as used herein, "snapshot" is necessarily the most recent copy of the cached translation table. While taking a snapshot, all updates to the translation table stored at the physical storage device are suspended. To ensure that partial writes to the physical storage device while taking a snapshot do not destroy the previous snapshot, basic banking and/or journaling mechanisms may be employed while taking a snapshot.

Because updates to the cached translation table after the snapshot has been taken will not be reflected in the snapshot if there is an unexpected power failure or shutdown, the cached translation table can be rebuilt/repaired by comparing the snapshot of the free list and the physical table. The physical table contains the mapping up to the unexpected event and can be compared to the snapshot of the free list to determine what changes in mapping occurred between the snapshot and shutdown. The snapshot of the free list is scanned and, if the PA from the free list is mapped in physical storage device, an update is made to the cached translation table to reflect this mapping. The scan continues until a PA on the free list is confirmed as being unmapped in the physical table, whereupon the cached translation table has been fully updated to reflect any changes in mapping subsequent to the snapshot and the repair procedure can be terminated.

For ease of illustration, aforementioned techniques are described in the example context of a cluster compute server as described below with reference to FIGS. 1-6. Examples of such systems include servers in the SM10000 series or the SM15000 series of servers available from the SeaMicro (™) division of Advanced Micro Devices, Inc. Although a general description is described below, additional details regarding embodiments of the cluster compute server are found in U.S. Pat. Nos. 7,925,802 and 8,140,719, the entireties of which are incorporated by reference herein. The techniques described herein are not limited to this example context, but instead may be implemented in any of a variety of processing systems or network systems.

FIG. 1 illustrates the cluster compute server in accordance with some embodiments. The cluster compute server, referred to herein as "server 100", comprises a data center platform that brings together, in a single rack unit (RU) system, computation, storage, switching, and server management. The server 100 is based on a parallel array of independent low power compute nodes (e.g., compute nodes 101-106), storage nodes (e.g., storage nodes 107-109), and network nodes (e.g., network nodes 110 and 111) linked together by a fabric interconnect 112, which comprises a high-bandwidth, low-latency supercomputer interconnect. Each node is implemented as a separate printed circuit board (PCB)-based card or blade, such as a field replaceable unit (FRU), to facilitate efficient build-up, scaling, maintenance, repair, and hot swap capabilities.

The compute nodes operate to execute various software programs, including operating systems (OSs), hypervisors, virtual machine (VM) software, compute applications, and the like. As with conventional server nodes, the compute nodes of the server 100 include one or more processors and system memory to store instructions and data for use by the one or more processors. However, unlike conventional server nodes, in some embodiments the compute nodes do not individually incorporate various peripherals, such as storage, I/O control, and network interface cards (NICs). Rather, peripheral resources of the server 100 are shared among the compute nodes, thereby allowing many of the components typically found on a server motherboard, such as I/O controllers and NICs, to be eliminated from the compute nodes and leaving primarily the one or more processors and the system memory, in addition to a fabric interface device. The fabric interface device, which may be implemented as, for example, an application-specific integrated circuit (ASIC), operates to virtualize the remote shared peripheral resources of the server 100 such that these remote peripheral resources appear to the OS executing at each processor to be located on corresponding processor's local peripheral bus. These virtualized peripheral resources can include, but are not limited to, mass storage devices, consoles, Ethernet NICs, basic input/output system (BIOS), Universal Serial Bus (USB) devices, Firewire (™) devices, and the like. This virtualization and sharing of remote peripheral resources in hardware renders the virtualization of the remote peripheral resources transparent to the OS and other local software at the compute nodes. Moreover, this virtualization and sharing of remote peripheral resources via the fabric interface device permits use of the fabric interface device in place of a number of components typically found on the server motherboard. This reduces the number of components implemented at each compute node, which in turn enables the compute nodes to have a smaller form factor while consuming less energy than conventional server blades which implement separate and individual peripheral resources.

The storage nodes and the network nodes (collectively referred to as "peripheral resource nodes") implement a peripheral device controller that manages one or more shared peripheral resources. This controller coordinates with the fabric interface devices of the compute nodes to virtualize and share the peripheral resources managed by the resource manager. To illustrate, the storage node 107 manages a physical storage device 116 and the storage node 108 manages a physical storage device 118. In some embodiments, any internal physical storage device can mount any processor. Further, physical storage devices may be logically separated into slices, or "virtual disks", each of which may be allocated to a single compute node or, if used in a read-only mode, shared by multiple compute nodes as a large shared data cache. The sharing of a virtual disk enables users to store or update common data, such as operating systems, application software, and cached data, once for the entire server 100. As another example of the shared peripheral resources managed by the peripheral resource nodes, the storage node 109 manages a remote BIOS 120, and the network nodes 110 and 111 each manage one or more Ethernet uplinks connected to a data center network 114. The Ethernet uplinks are analogous to the uplink ports of a top-of rack switch and can be configured to connect directly to, for example, an end-of-row switch or core switch of the data center network 114. The remote BIOS 120 can be virtualized in the same manner as physical storage devices, NICs and other peripheral resources so as to operate as the local BIOS for some or all of the nodes of the server, thereby permitting such nodes to forgo implementation of a local BIOS at each node.

The fabric interface device of the compute nodes, the fabric interfaces of the peripheral resource nodes, and the fabric interconnect 112 together operate as a supercomputer fabric 122 connecting the computing resources of the compute nodes with the peripheral resources of the peripheral resource nodes. To this end, the supercomputer fabric 122 implements a distributed switching facility whereby each of the fabric interfaces and fabric interface devices comprises multiple ports connected to bidirectional links of the fabric interconnect 112 and operate as Open Systems Interconnect (OSI) layer switches to route packet traffic among the ports in accordance with distributed routing tables implemented at the nodes of the server 100.

The fabric interconnect 112 can include a fixed or flexible interconnect such as a backplane, a printed wiring board, a motherboard, cabling or other flexible wiring, or a combination thereof. Moreover, the fabric interconnect 112 can include electrical signaling, photonic signaling, or a combination thereof. In some embodiments, the links of the fabric interconnect 112 comprise high-speed bi-directional serial links implemented in accordance with one or more of a Peripheral Component Interconnect—Express (PCIE) standard, a Rapid IO standard, a Rocket IO standard, a Hyper-Transport standard, a FiberChannel standard, an Ethernet-based standard, such as a Gigabit Ethernet (GbE) Attachment Unit Interface (XAUI) standard, and the like.

Although the FRUs or other types of cards implementing the nodes typically are physically arranged in one or more rows in a server box as described below with reference to FIG. 3, the supercomputer fabric 122 can logically arrange the nodes in any of a variety of network topologies, such as a torus, a multi-dimensional torus (also referred to as a k-ary n-cube), a tree, a fat tree, and the like. For purposes of illustration, the server 100 is described herein in the context of a multi-dimensional torus network topology. However, the described techniques may be similarly applied in other network topologies using the guidelines provided herein.

Figure 2:
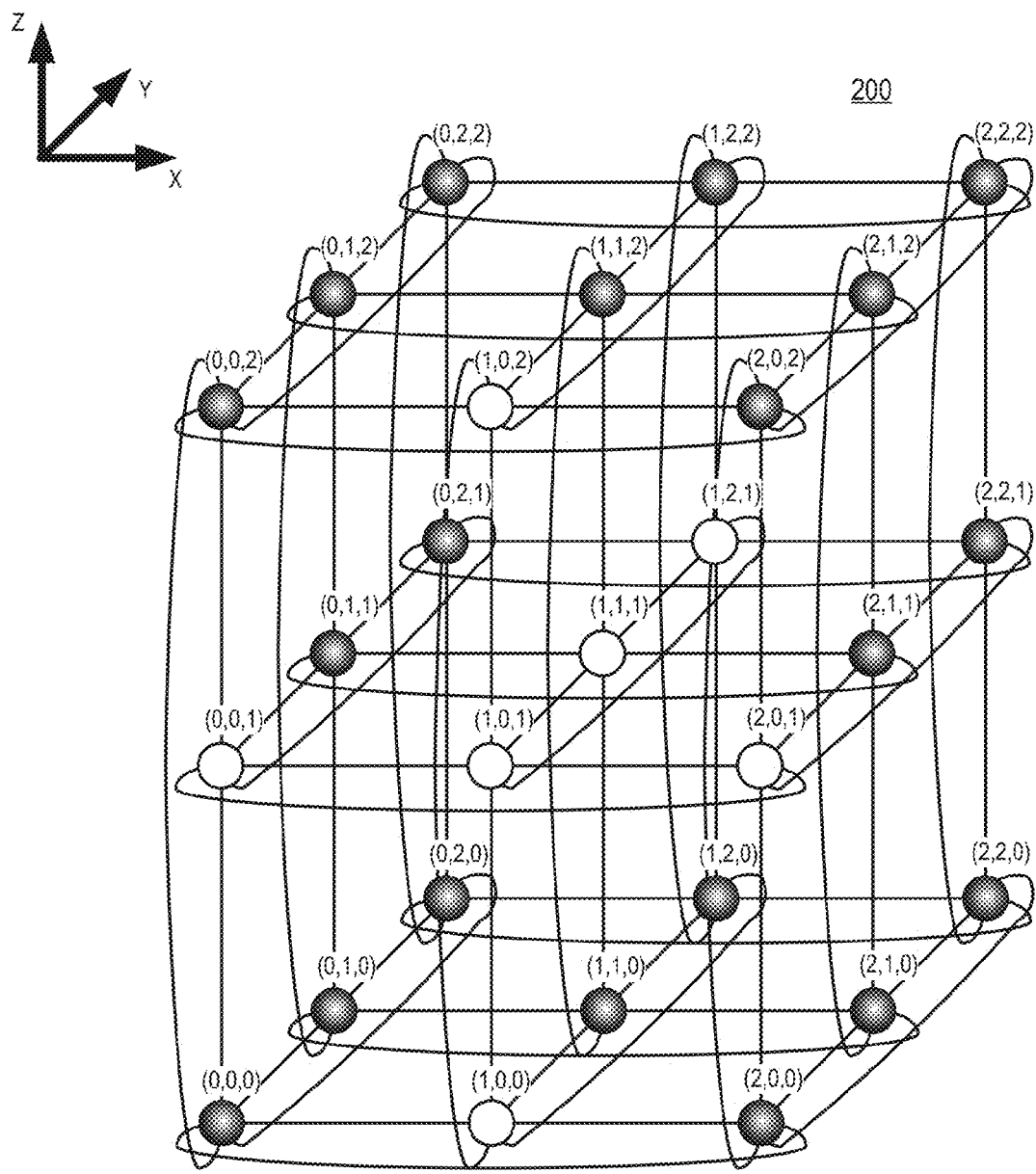
FIG. 2 is a diagram illustrating a configuration of the server of FIG. 1 in accordance with some embodiments.

FIG. 2 illustrates an example configuration of the server 100 in a network topology arranged as a k-ary n-cube, or multi-dimensional torus, in accordance with some embodiments. In the depicted example, the server 100 implements a three-dimensional (3D) torus network topology (referred to herein as "torus network 200") with a depth of three (that is, k=n=3). Accordingly, the server 100 implements a total of twenty-seven nodes arranged in a network of rings formed in three orthogonal dimensions (X,Y,Z), and each node is a member of three different rings, one in each of the dimensions. Each node is connected to six neighboring nodes via bidirectional serial links of the fabric interconnect 112 (see FIG. 1). The relative position of each node in the torus network 200 is identified in FIG. 2 by the tuple (x,y,z), where x, y, and z represent the position of the processing node in the X, Y, and Z dimensions, respectively. As such, the tuple (x,y,z) of a node also may serve as its address within the torus network 200, and thus its address in the server 100. In some embodiments, each node is assigned a media access control (MAC) address reflective of its position tuple (x,y,z), which allows the position of the node in the torus to be determined based on its MAC address.

It will be appreciated that the illustrated X,Y, and Z dimensions represent logical dimensions that describe the positions of each node in a network, but do not necessarily represent physical dimensions that indicate the physical placement of each node. For example, the 3D torus network topology for torus network 200 can be implemented via the wiring of the fabric interconnect 112 with the nodes in the network physically arranged in one or more rows on a backplane or in a rack. That is, the relative position of a given node in the torus network 200 is defined by nodes to which it is connected, rather than the physical location of the processing node. In some embodiments, the supercomputing fabric 122 (see FIG. 1) comprises a plurality of sockets wired together via the fabric interconnect 112 so as to implement the 3D torus network topology, and each of the nodes comprises a field replaceable unit (FRU) configured to couple to the sockets used by the fabric interconnect 112, such that the position of the node in torus network 200 is dictated by the socket into which the node is inserted.

In the server 100, messages or commands communicated between nodes are segmented into one or more packets, which are routed over a routing path between the source node and the destination node. The routing path may include zero, one, or more than one intermediate nodes. As noted above, each node includes an interface to the fabric interconnect 112 that implements a layer 2 switch to route packets among the ports of the node connected to corresponding links of the fabric interconnect 112. In some embodiments, these distributed switches operate to route packets over the supercomputer fabric 122 using a fixed routing scheme that employs strict deterministic dimensional order routing (that is, completely traversing the torus network 200 in one dimension before moving to another dimension) in order to avoid fabric deadlocks. Moreover, as there are multiple routes between nodes in the torus network 200, the supercomputer fabric 212 can be programmed for packet traffic to traverse a secondary path in case of a primary path failure. The supercomputer fabric 212 also can implement packet classes and virtual channels to more effectively utilize the link bandwidth and eliminate packet loops, and thus avoid the need for link-level loop prevention and redundancy protocols such as the spanning tree protocol.

In some embodiments, certain types of nodes may be limited in their routing capabilities by design. For example, compute nodes may be permitted to act as intermediate nodes that exist in the routing path of a packet between the source node of the packet and the destination node of the packet, whereas peripheral resource nodes may be configured so as to act as only source or destination nodes, and not as intermediate nodes that route packets to other nodes. In such scenarios, the routing rules of the supercomputing fabric 122 can be configured to ensure that data is not routed through peripheral nodes.

Various packet routing and techniques protocols may be implemented by the supercomputer fabric 122. For example, to avoid the need for large buffers at switch of each node, the supercomputer fabric 122 may flow control digit ("flit")-based switching whereby each packet is segmented into a sequence of flits. The first flit, called the header flit, holds information about the packet's route (namely the destination address) and sets up the routing behavior for all subsequent flit associated with the packet. The header flit is followed by zero or more body flits, containing the actual payload of data. The final flit, called the tail flit, performs some book keeping to close the connection between the two nodes. These flits then may be routed through the torus network 200 using cut-through routing, which allocates buffers and channel bandwidth on a packet level, or wormhole routing, which allocated buffers and channel bandwidth on a flit level. Wormhole routing has the advantage of enabling the use of virtual channels in the torus network 200. A virtual channel holds the state needed to coordinate the handling of the flits of a packet over a channel, which includes the output channel of the current node for the next hop of the route and the state of the virtual channel (e.g., idle, waiting for resources, or active). The virtual channel may also include pointers to the flits of the packet that are buffered on the current node and the number of flit buffers available on the next node.

Figure 3:
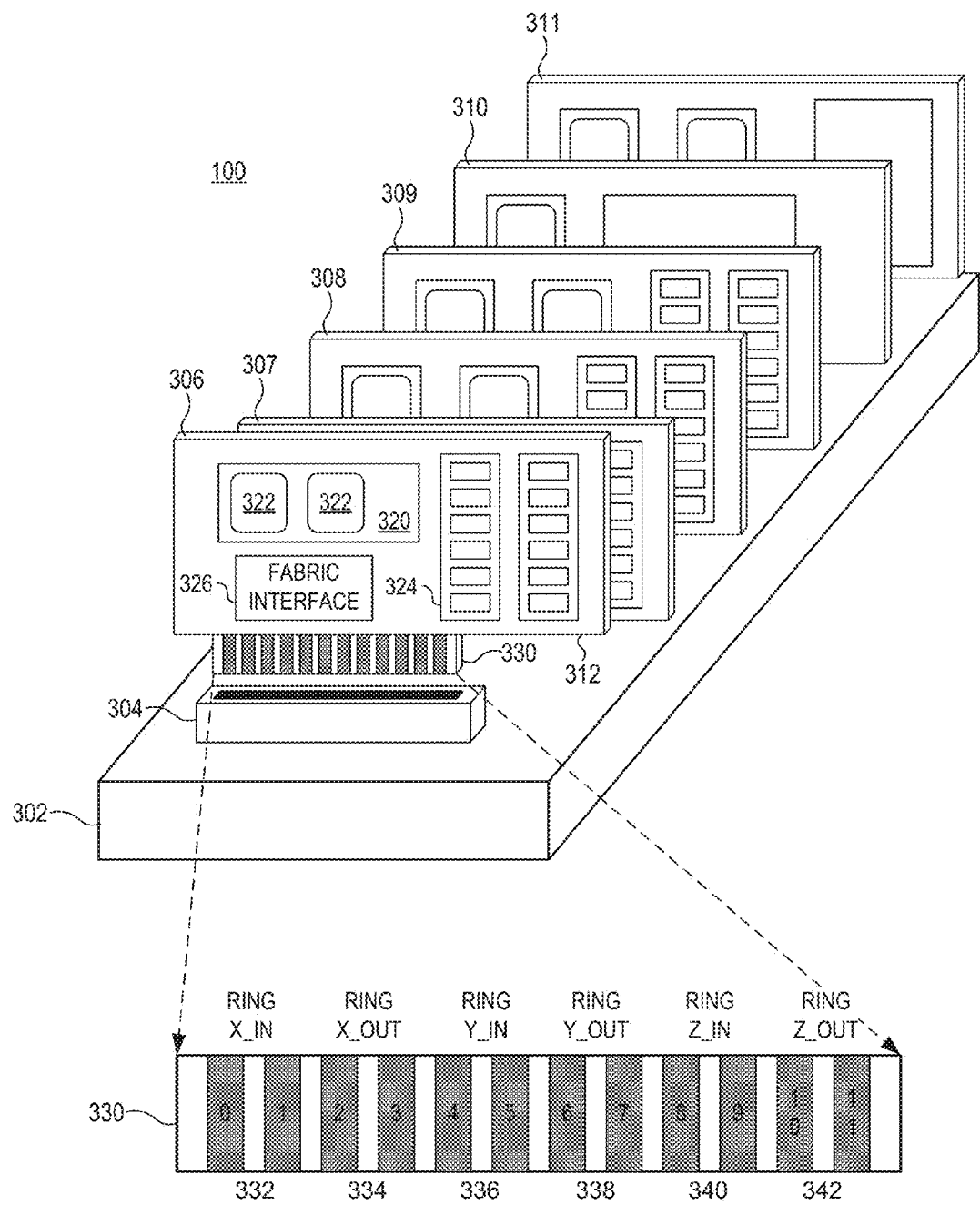
FIG. 3 illustrates an example physical arrangement of nodes of the server of FIG. 1 in accordance with some embodiments.

FIG. 3 illustrates an example physical arrangement of nodes of the server 100 in accordance with some embodiments. In the illustrated example, the fabric interconnect 112 includes one or more interconnects 302 having one or more rows or other aggregations of plug-in sockets 304. The interconnect 302 can include a fixed or flexible interconnect, such as a backplane, a printed wiring board, a motherboard, cabling or other flexible wiring, or a combination thereof. Moreover, the interconnect 302 can implement electrical signaling, a photonic signaling, or a combination thereof. Each plug-in socket 304 comprises a card-edge socket that operates to connect one or more field replaceable units (FRUs), such as FRUs 306-311, with the interconnect 302. Each FRU represents a corresponding node of the server 100. For example, FRUs 306-309 can comprise compute nodes, FRU 310 can comprise a network node, and FRU 311 can comprise a storage node.

Each FRU includes a PCB and components disposed thereon, whereby the components are interconnected via metal layers of the PCB and provide the functionality of the node represented by the FRU. For example, the FRU 306, being a compute node in this example, includes a PCB 312 implementing a processor 320 comprising one or more processor cores 322, one or more memory modules 324, such as DRAM dual inline memory modules (DIMMs), and a fabric interface device 326. Each FRU further includes a socket interface 330 that operates to connect the FRU to the interconnect 302 via the plug-in socket 304.

The interconnect 302 provides data communication paths between the plug-in sockets 304, such that the interconnect 302 operates to connect FRUs into rings and to connect the rings into a 2D- or 3D-torus network topology, such as the torus network 200 of FIG. 2. The FRUs take advantage of these data communication paths through their corresponding fabric interfaces, such as the fabric interface device 326 of the FRU 306. The socket interface 330 provides electrical contacts (e.g., card edge pins) that electrically connect to corresponding electrical contacts of plug-in socket 304 to act as port interfaces for an X-dimension ring (e.g., ring-X_IN port 332 for pins 0 and 1 and ring-X_OUT port 334 for pins 2 and 3), for a Y-dimension ring (e.g., ring-Y IN port 336 for pins 4 and 5 and ring-Y_OUT port 338 for pins 6 and 7), and for an Z-dimension ring (e.g., ring-Z_IN port 340 for pins 8 and 9 and ring-Z_OUT port 342 for pins 10 and 11). In the illustrated embodiment, each port is a differential transmitter comprising either an input port or an output port of, for example, a PCIE lane. The skilled artisan will understand that a port can include additional TX/RX signal pins to accommodate additional lanes or additional ports.

Figure 4:
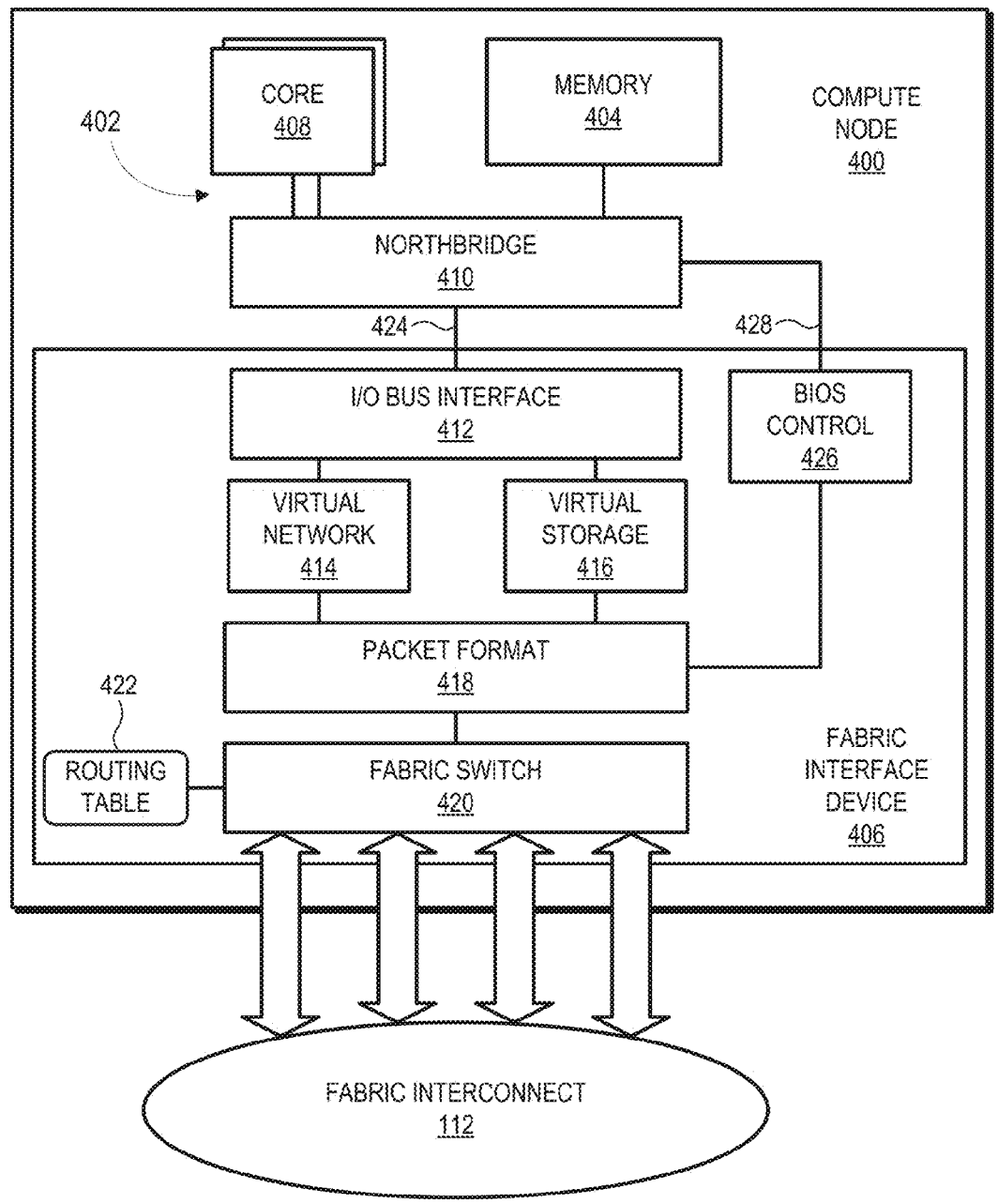
FIG. 4 is a block diagram illustrating a compute node implemented in the server of FIG. 1 in accordance with some embodiments.

FIG. 4 illustrates a compute node 400 implemented in the server 100 of FIG. 1 in accordance with some embodiments. The compute node 400 corresponds to, for example, one of the compute nodes 101-106 of FIG. 1. In the depicted example, the compute node 400 includes a processor 402, system memory 404, and a fabric interface device 406 (corresponding to the processor 320, system memory 324, and the fabric interface device 326, respectively, of FIG. 3). The processor 402 includes one or more processor cores 408 and a northbridge 410. The one or more processor cores 408 can include any of a variety of types of processor cores, or combination thereof, such as a central processing unit (CPU) core, a graphics processing unit (GPU) core, a digital signal processing unit (DSP) core, and the like, and may implement any of a variety of instruction set architectures, such as an x86 instruction set architecture or an Advanced RISC Machine (ARM) architecture. The system memory 404 can include one or more memory modules, such as DRAM modules, SRAM modules, flash memory, or a combination thereof. The northbridge 410 interconnects the one or more cores 408, the system memory 404, and the fabric interface device 406. The fabric interface device 406, in some embodiments, is implemented in an integrated circuit device, such as an application-specific integrated circuit (ASIC), a field-programmable gate array (FPGA), mask-programmable gate arrays, gate arrays, programmable logic, and the like.

In a conventional computing system, the northbridge 410 would be connected to a southbridge, which would then operate as the interface between the northbridge 410 (and thus the processor cores 208) and one or more local I/O controllers that manage local peripheral resources. However, as noted above, in some embodiments the compute node 400 does not maintain local peripheral resources or their I/O controllers, and instead uses shared remote peripheral resources at other nodes in the server 100. To render this arrangement transparent to software executing at the processor 402, the fabric interface device 406 virtualizes the remote peripheral resources allocated to the compute node such that the hardware of the fabric interface device 406 emulates a southbridge and thus appears to the northbridge 410 as a local southbridge connected to local peripheral resources.

To this end, the fabric interface device 406 includes an I/O bus interface 412, a virtual network controller 414, a virtual storage controller 416, a packet formatter 418, and a fabric switch 420. The I/O bus interface 412 connects to the northbridge 410 via a local I/O bus 424 and acts as a virtual endpoint for each local processor core 408 by intercepting requests addressed to virtualized peripheral resources that appear to be on the local I/O bus 424 and responding to the requests in the same manner as a local peripheral resource, although with a potentially longer delay due to the remote location of the peripheral resource being virtually represented by the I/O bus interface 412.

While the I/O bus interface 412 provides the physical interface to the northbridge 410, the higher-level responses are generated by the virtual network controller 414 and by the virtual storage controller 416. Requests sent over I/O bus 424 for a network peripheral, such as an Ethernet NIC, are routed by the I/O bus interface 412 to the virtual network controller 414, while all other requests are routed by the I/O bus interface 412 to the virtual storage controller 416. The virtual network controller 414 provides processing of incoming and outgoing requests based on, for example, an Ethernet protocol. The virtual storage controller 416 provides processing of incoming and outgoing requests based on, for example, a serial ATA (SATA) protocol, a serial attached SCSI (SAS) protocol, a Universal Serial Bus (USB) protocol, and the like.

After being processed by either the virtual network controller 414 or the virtual storage controller 416, requests are forwarded to the packet formatter 418, which encapsulates the request into one or more packets. The packet formatter 418 then determines the address or other location identifier of the peripheral resource node managing the physical peripheral resource intended for the request using a distributed routing table 422 maintained by the fabric switch 420. The packet formatter 418 adds the address to the headers of the one or more packets in which the request is encapsulated, and the fabric switch 420 then transmits the one or more packets to the next node in the routing path via the fabric interconnect 112.

As illustrated, the fabric switch 420 implements a plurality of ports, each port interfacing with a different link of the fabric interconnect 112. To illustrate using the 3×3 torus network 200 of FIG. 2, assume the compute node 400 represents the node at (1,1,1). In this example, the fabric switch 420 would have at least seven ports to couple it to seven bi-directional links: an internal link to the packet formatter 418; an external link to the node at (0,1,1); an external link to the node at (1,0,1), an external link to the node at (1,1,0), an external link to the node at (1,2,1), an external link to the node at (2,1,1), and an external link to the node at (1,1,2). Control of the switching of data among the ports of the fabric switch 420 is determined based on the distributed routing table 422, which specifies the egress port based on the destination address indicated by the packet.

For responses to outgoing requests and other incoming requests (e.g., requests from other compute nodes or from peripheral resource nodes), the process described above is reversed. The fabric switch 420 receives an incoming packet and routes the incoming packet to the port connected to the packet formatter 418 based on the distributed routing table 422. The packet formatter 418 then deencapsulates the response/request from the packet and provides it to either the virtual network controller 414 or the virtual storage controller 416 based on a type-identifier included in the request. The controller receiving the request then processes the response/request and controls the I/O bus interface 412 to signal the request to the northbridge 410, whereupon the response/request is processed as though it were a response or request from a local peripheral resource.

For a transitory packet for which the compute node 400 is an intermediate node in the routing path for the packet, the fabric switch 420 determines the destination address (e.g., the tuple (x,y,z)) from the header of the transitory packet, and provides the packet to a corresponding output port identified from the routing information represented in the distributed routing table 422.

As noted above, the BIOS likewise can be a virtualized peripheral resource. In such instances, the fabric interface device 406 can include a BIOS controller 426 connected to the northbridge 410 either through the local I/O interface bus 424 or via a separate low pin count (LPC) bus 428. As with storage and network resources, the BIOS controller 426 can emulate a local BIOS by responding to BIOS requests from the northbridge 410 by forwarding the BIOS requests via the packet formatter 418 and the fabric switch 420 to a peripheral resource node managing a remote BIOS, and then providing the BIOS data supplied in turn to the northbridge 410.

Figure 5:
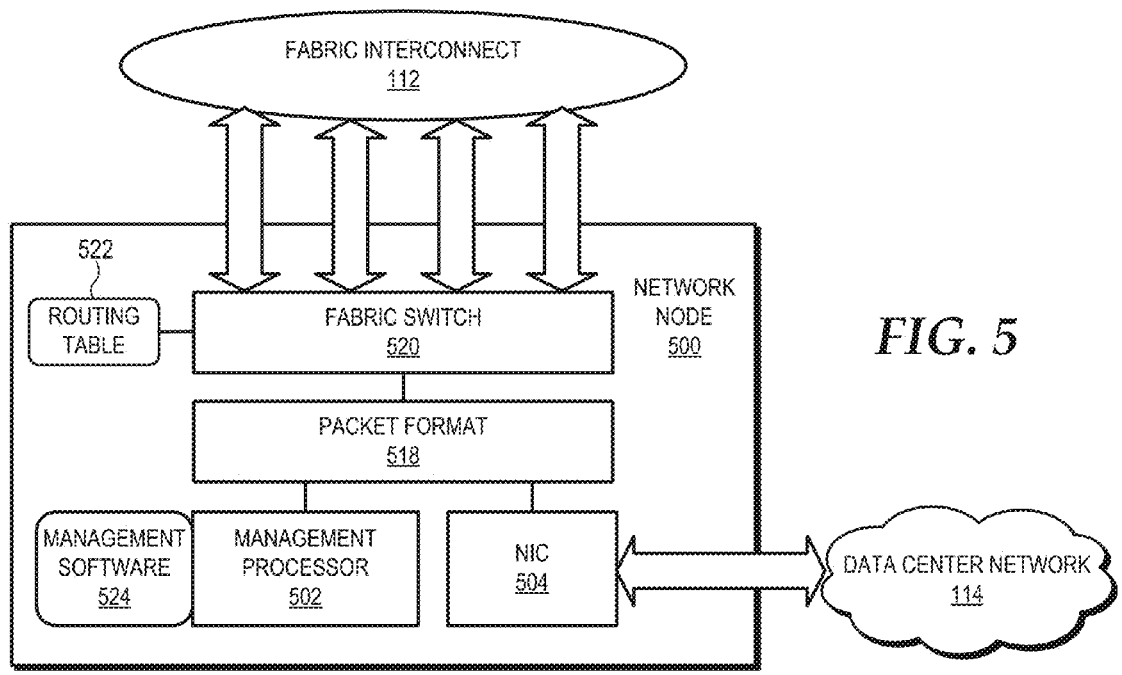
FIG. 5 is a block diagram illustrating a network node implemented in the server of FIG. 1 in accordance with some embodiments.

FIG. 5 illustrates a network node 500 implemented in the server 100 of FIG. 1 in accordance with some embodiments. The network node 500 corresponds to, for example, network nodes 110 and 111 of FIG. 1. In the depicted example, the network node 500 includes a management processor 502, a NIC 504 connected to, for example, an Ethernet network such as the data center network 114, a packet formatter 518, and a fabric switch 520. As with the fabric switch 420 of FIG. 4, the fabric switch 520 operates to switch incoming and outgoing packets among its plurality of ports based on a local distributed routing table 522. A packetized incoming request intended for the NIC 504 (which is virtualized to appear to the processor 402 of a compute node 400 as a local NIC) is intercepted by the fabric switch 520 from the fabric interconnect 112 and routed to the packet formatter 518, which deincapsulates the packet and forwards the request to the NIC 504. The NIC 504 then performs the one or more operations dictated by the request. Conversely, outgoing messages from the NIC 504 are encapsulated by the packet formatter 518 into one or more packets, and the packet formatter 518 determines the destination address using the distributed routing table 522 and inserts the destination address into the header of the outgoing packets. The outgoing packets are then switched to the port associated with the link in the fabric interconnect 112 connected to the next node in the fixed routing path between the network node 500 and the intended destination node.

The management processor 502 executes management software 524 stored in a local storage device (e.g., firmware ROM or flash memory) to provide various management functions for the server 100. These management functions can include maintaining a centralized master routing table and distributing portions thereof to individual nodes. Further, the management functions can include link aggregation techniques, such implementation of IEEE 802.3ad link aggregation, and media access control (MAC) aggregation and hiding.

Figure 6:
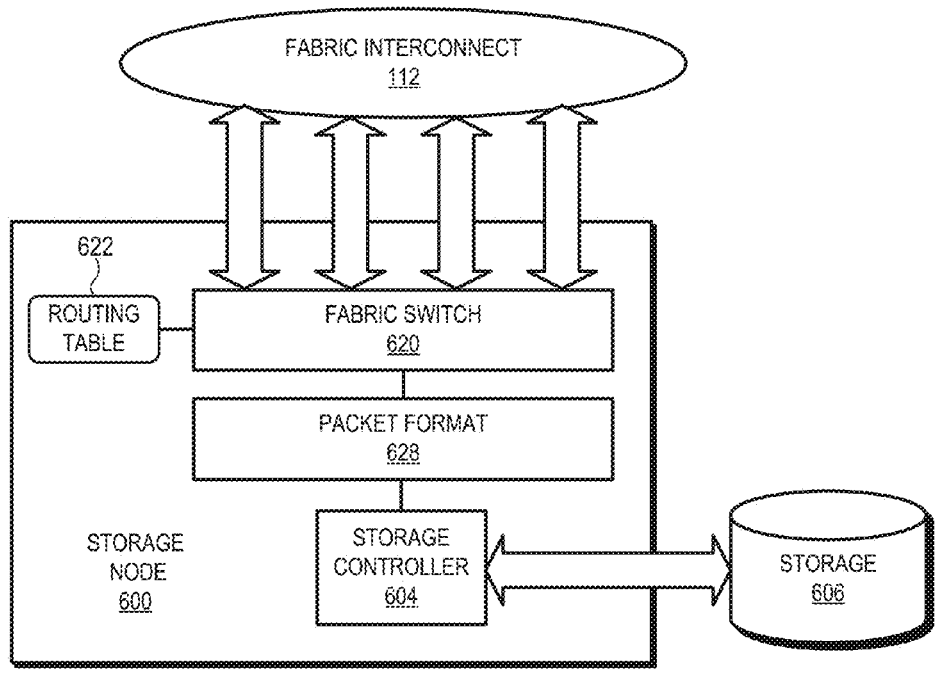
FIG. 6 is a block diagram illustrating a storage node implemented in the server of FIG. 1 in accordance with some embodiments.

FIG. 6 illustrates a storage node 600 implemented in the server 100 of FIG. 1 in accordance with some embodiments. The storage node 600 corresponds to, for example, storage nodes 107-109 of FIG. 1. As illustrated, the storage node 600 is configured similar to the network node 500 of FIG. 5 and includes a fabric switch 620, a packet formatter 618, and distributed routing table 622, which operate in the manner described above with reference to the fabric switch 520, the packet formatter 518, and the distributed routing table 522 of the network node 500 of FIG. 5. However, rather than implementing a NIC, the storage node 600 implements a storage device controller 604, such as a SATA controller. A depacketized incoming request is provided to the storage device controller 604, which then performs the operations represented by the request with respect to a physical storage device 606 or other peripheral device (e.g., a USB-based device). Data and other responses from the peripheral device are processed by the storage device controller 604, which then provides a processed response to the packet formatter 618 for packetization and transmission by the fabric switch 620 to the destination node via the fabric interconnect 112.

Figure 7:
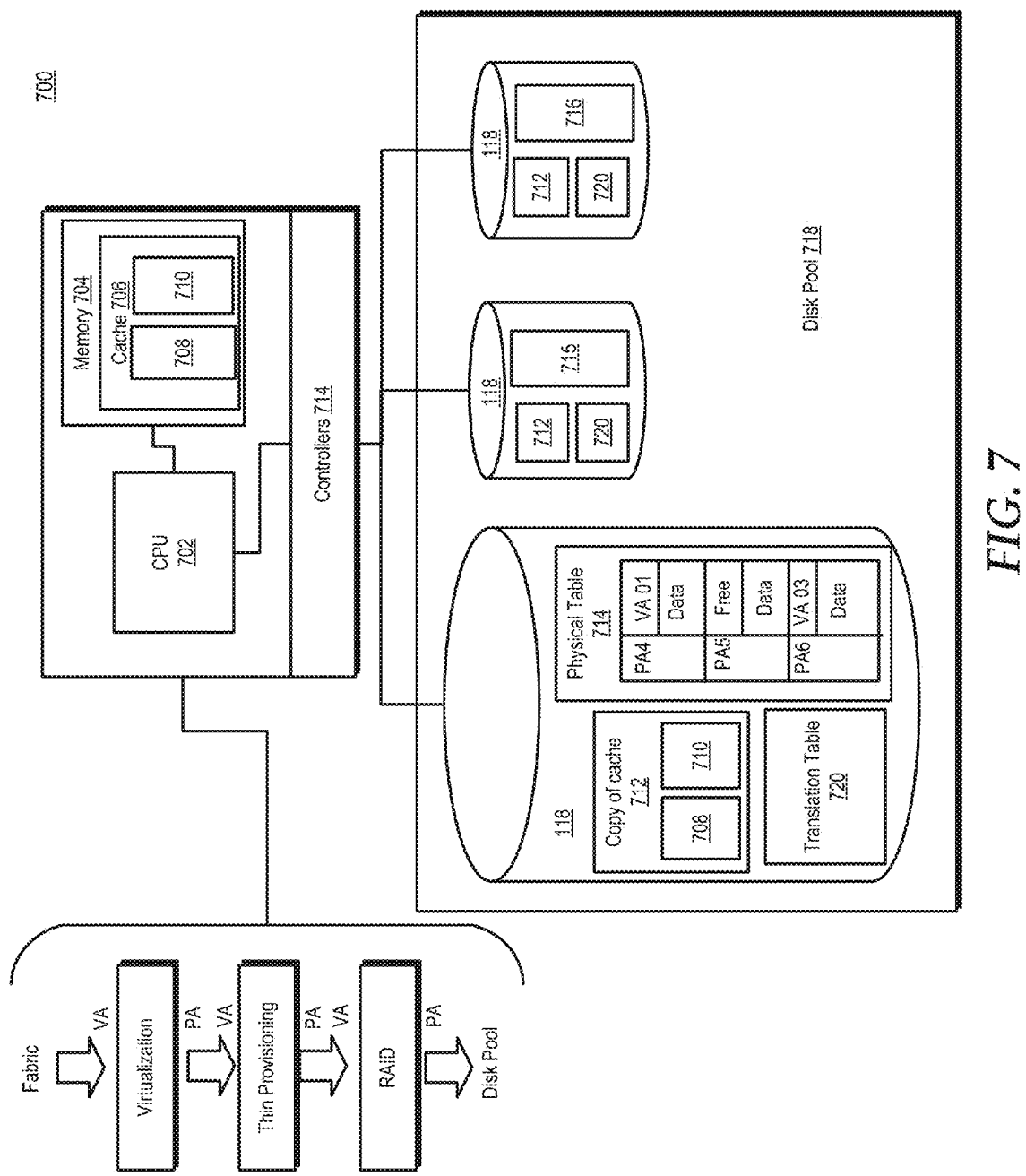
FIG. 7 is a block diagram illustrating an example system for performing thin provisioning in accordance with some embodiments.

FIG. 7 illustrates and example system 700 for performing thin provisioning in accordance with some embodiments. The system may include a CPU 702, a memory 704, and controllers 714 and physical storage devices 118, all in operable communication with each other. The physical storage devices 118 collectively comprise a disk pool 718. The CPU 702, memory 704 and controllers 714 may be located on a single node or may be dispersed among multiple nodes. For example, the CPU 702 may correspond to the processor core 408 of a compute node 400 or the management processor 502 of a network node 500, the memory 704 may correspond to the system memory 404 of the compute node 400, and the controllers may correspond to the storage device controllers 604 of the storage nodes 600. The system 700 further includes a cache 706 within the memory 704 wherein a translation table 708 and 710 may be stored. An atomic snapshot 112 of the cached translation table 708 and free list 710 may be taken periodically and stored at the physical storage devices 118 along with the physical tables 714-716 containing blocks of data, each having a unique PA.

Figure 8:
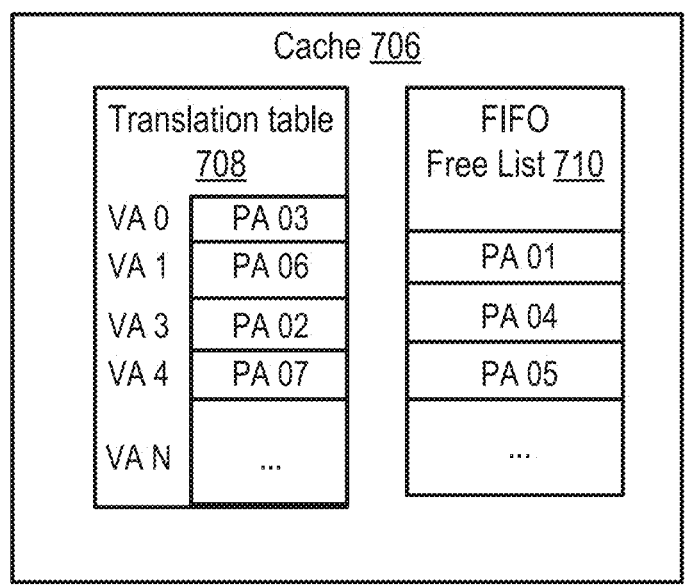
FIG. 8 is a block diagram illustrating cached versions of a translation table and corresponding FIFO free list in accordance with some embodiments.

FIG. 8 illustrates cached versions of the translation table 708 and corresponding FIFO free list 710 in accordance with some embodiments. The translation table 708 contains the list of VAs available to the system and a corresponding PA, if one has been mapped to a VA. To illustrate, the example translation table 708 shows that VA0 has been mapped to PA03, VA1 has been mapped to PA06, etc. The free list 710 contains the PAs available on the physical storage device 118 that have not yet been mapped to a VA. The example free list 710 shows PA01, PA04 and PA05 have not yet been mapped to a VA. Both the cached translation table 708 and free list 710 are continually updated as the system 700 performs disk write functions as described in FIG. 10.

Figure 9:
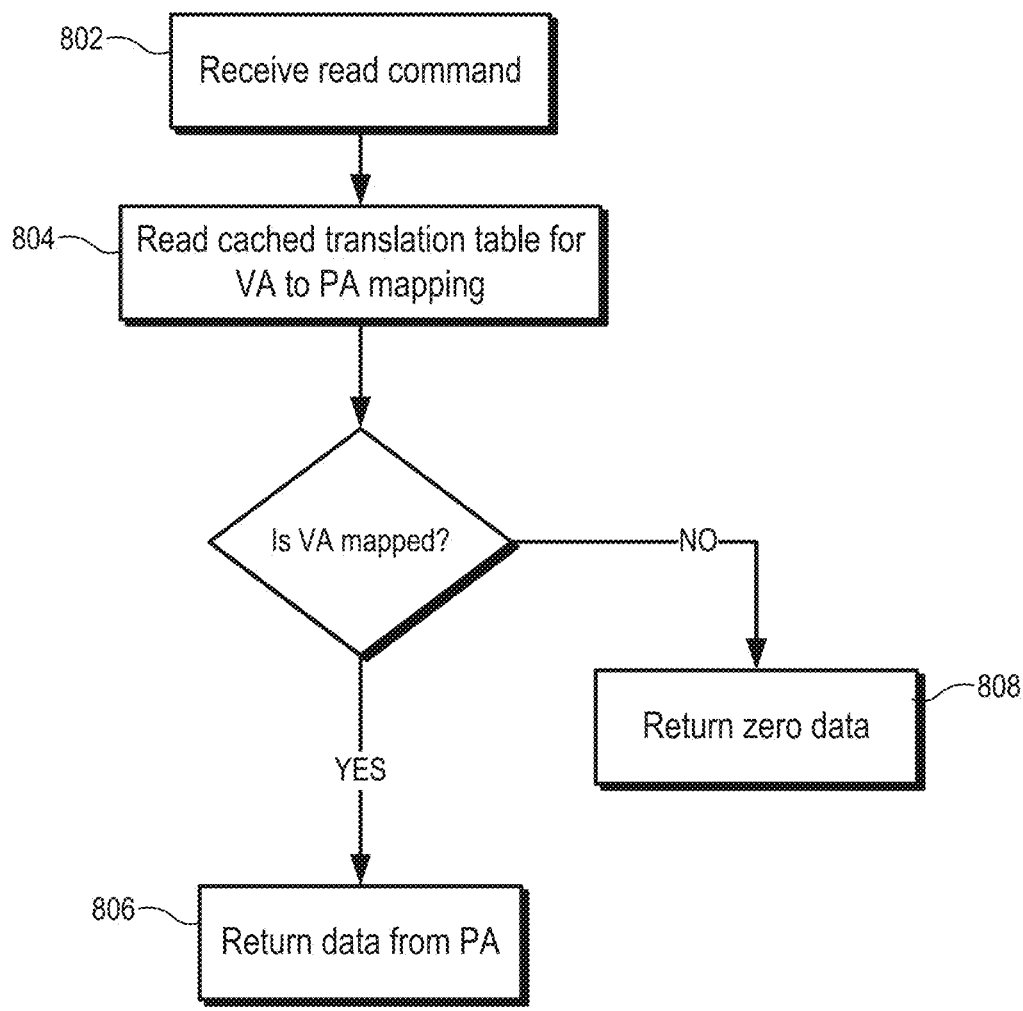
FIG. 9 is a flow diagram illustrating an example method for performing a read function utilizing the cached translation table and free list in accordance with some embodiments.

FIG. 9 illustrates a method 800 for a performing read function utilizing the cached translation table and free list in accordance with some embodiments. The method initiates at block 802, whereupon a read call is received at a node within the compute server 100. At block 804, the translation table 708 in cache is read to obtain the VA to PA mapping. If the VA is mapped, at block 806, data contained at the mapped PA is returned, otherwise zero data is returned, at block 808.

Figure 10:
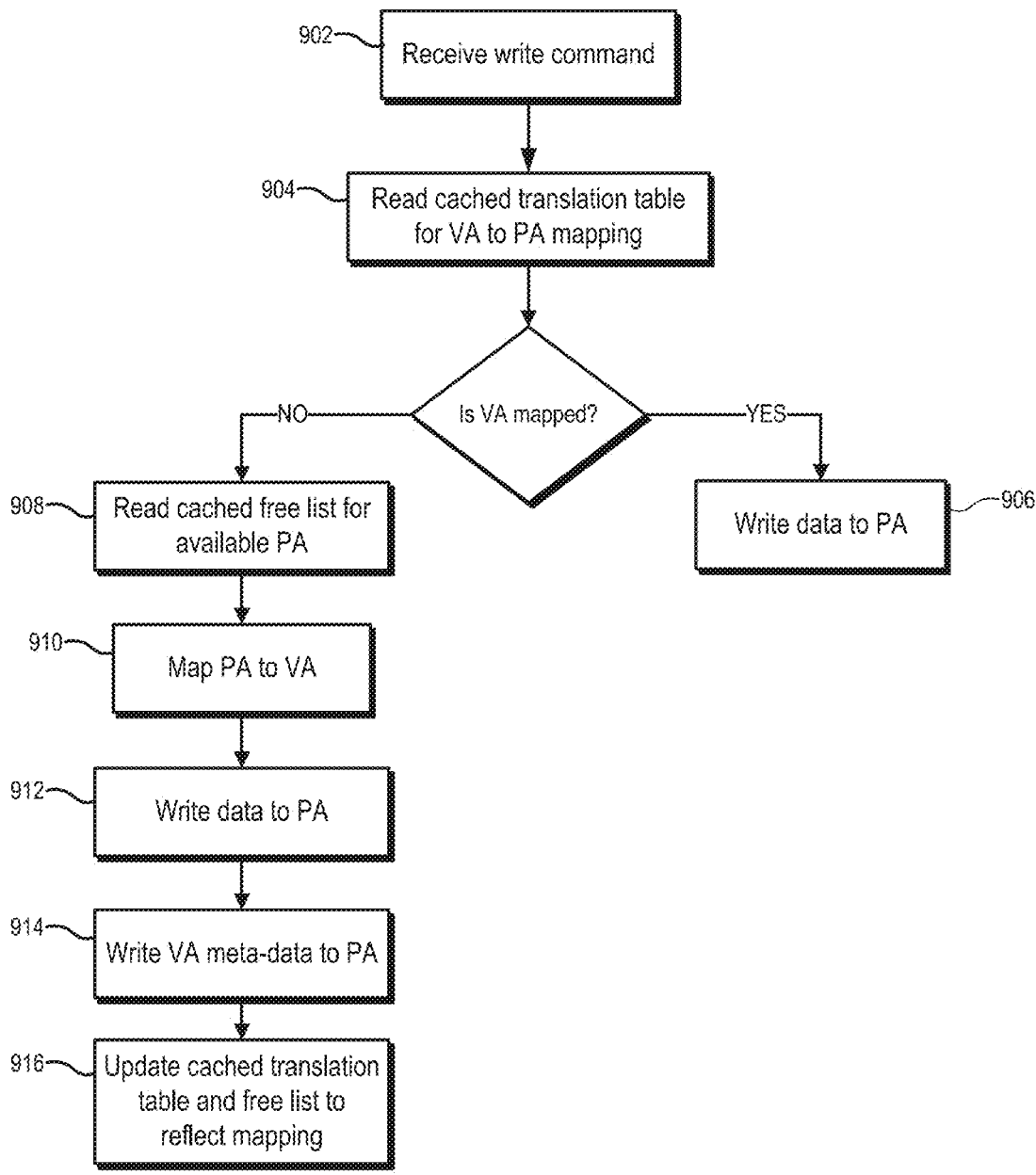
FIG. 10 is a flow diagram illustrating an example method for performing a write function utilizing the cached translation table and free list in accordance with some embodiments.

FIG. 10 illustrates a method 900 for a performing a write function utilizing the cached translation table 708 and free list 710 in accordance with some embodiments. The method initiates at block 902, whereupon a write call is received at a node within the compute server 100. At block 904, the translation table 708 in cache is read to obtain the VA to PA mapping. If the VA is mapped, at block 906, data is written to the physical storage device 118 at the mapped PA. No changes to the translation table 708, at either the physical storage device 118 or the cache 706, are made. If the VA is not mapped, at block 908, the cached free list 710 is read to obtain an available PA. The obtained PA is then mapped to the VA, at block 910. At block, 912, the data is written to the physical storage device 118 at the obtained PA. The metadata containing the mapped VA is also written to the available PA, at block 914. The cached translation table 708 and free list 710 are then updated to reflect that the VA has been mapped to the PA and that the PA is no longer free, at block 916. Alternatively, the translation table 708 and free list 710 may be updated prior to writing data or metadata to the PA.

Figure 11:
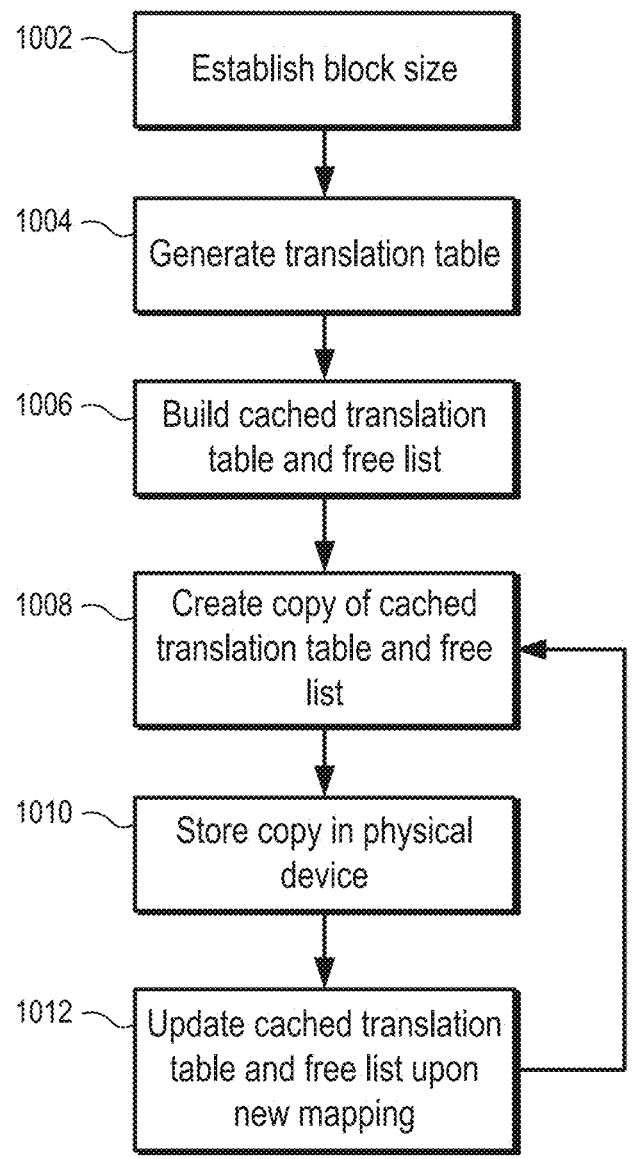
FIG. 11 is a flow diagram illustrating an example method for building and updating the cached translation table and free list in accordance with some embodiments.

FIG. 11 illustrates an example method 1000 for building and updating the cached translation table and free list in accordance with some embodiments. For ease of illustration, the method 1000 is described in the example context of the compute server system depicted in FIGS. 1-6. The method initiates at block 1002 whereupon a fixed size for blocks of data to be stored in physical storage device is established. A fixed block size offers lower complexity compared to dynamic or multiple block size schemes and can be established so as to balance translation table size with reasonable free space efficiency and worst-case fragmented performance. For example, a relatively large block size (e.g., >512 KB) results in lower free space efficiency and higher worst-case fragmented performance, but also allows for a smaller translation table that requires minimal storage space. Conversely, a relatively small block size (e.g., <256 KB) results in higher free space efficiency and lower worst-case fragmented performance while also resulting in a larger translation table requiring more of the available storage space. Thus, a fixed block size that balances the aforementioned factors can be established on a per-system or per-node basis.

At block 1004, a translation table 720 containing VA to PA mapping is generated and stored to the physical storage device 118 the compute server 100. Initially, the translation table 720 is empty, with all physical addresses listed in the free list 710. In one embodiment, the translation table is distributed within the physical tables 714-716 stored at the physical storage device 118. This allows for the translation table to be updated during a write procedure without the need for an additional seek of the physical storage device. At block 1006, a cached version of the translation table 708, along with a corresponding free list 710, can then be built from either the translation table stored in physical storage device 118 or from the information distributed within the physical tables 714-716.

An atomic snapshot 712 of the cached translation table and free list is then created, at block 1008, and stored at the physical storage device 118, at block 1010. The snapshot 712 can be used to build the translation table 708 and free list 710 to the cache 706 when the system is initially booted or if the cache 706 is affected by an unexpected shutdown. As such, a new snapshot is created periodically while the system is powered on and prior to power shutdown. Because the snapshot 712 is atomic, all updates to the cached translation table 708 are suspended while the snapshot 712 is being created and basic banking/journaling mechanisms may be employed to ensure that partial writes to the physical storage device 118 during creation of the snapshot 712 do not destroy the previous snapshot.

Figure 12:
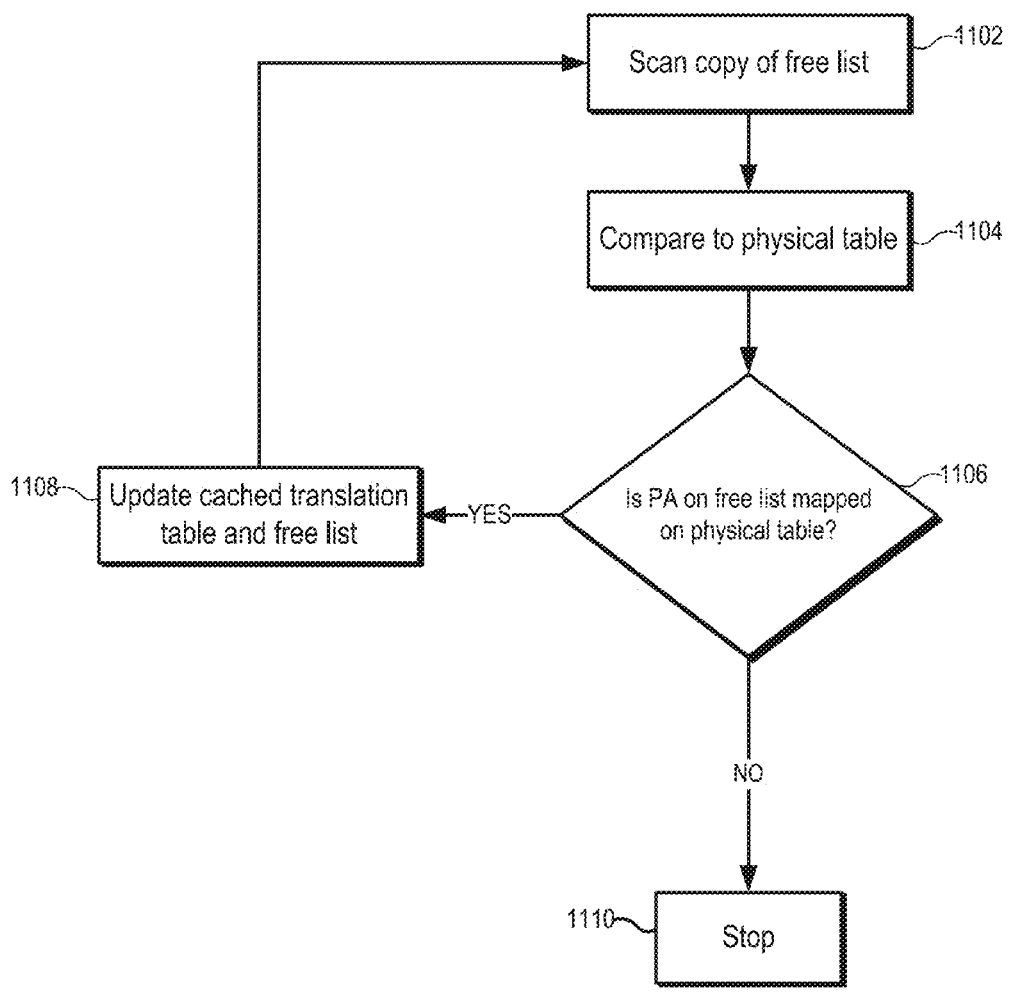
FIG. 12 is a flow diagram illustrating an example method for building or repairing the cached translation table and free list subsequent to an unexpected shut down in accordance with some embodiments.

FIG. 12 illustrates a method 1100 for building and updating a cached translation table 708 and free list 710 subsequent to an unexpected shut down affecting the cache 706 in accordance with some embodiments. The method initiates at block 1102, where the snapshot 712 of the free list is scanned and compared to the physical table 714, at block 1104. At block 1106, a determination is made as to whether the PA on the free list is, in fact, free and available for mapping. If the PA has been mapped to a VA, at block 1108, the cached translation table 708 is updated with the mapping information and the PA is removed from the free list. The scan of the snapshot 712 of the free list continues until the physical table 714 shows that the listed PA is free and available for mapping. Because the free list is a FIFO list, it follows that once the first instance of agreement between the snapshot 712 of the free list and the physical list 714 is encountered during the scan, all updates to the translation table 708 have been accounted for since the last snapshot 712 was taken and the repair process can terminate, at block 1110.

In some embodiments, the apparatus and techniques described above are implemented in a system comprising one or more integrated circuit (IC) devices (also referred to as integrated circuit packages or microchips), such as the techniques for thin provisioning described above with reference to FIGS. 1-12. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disk (CD), digital versatile disk (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM, DRAM or ROM), fixedly attached to the computing system (e.g., a magnetic hard drive), removably attached to the computing system (e.g., an optical disk or Universal Serial Bus (USB)-based Flash memory), or coupled to the computer system via a wired or wireless network (e.g., network accessible storage (NAS)).

Figure 13:
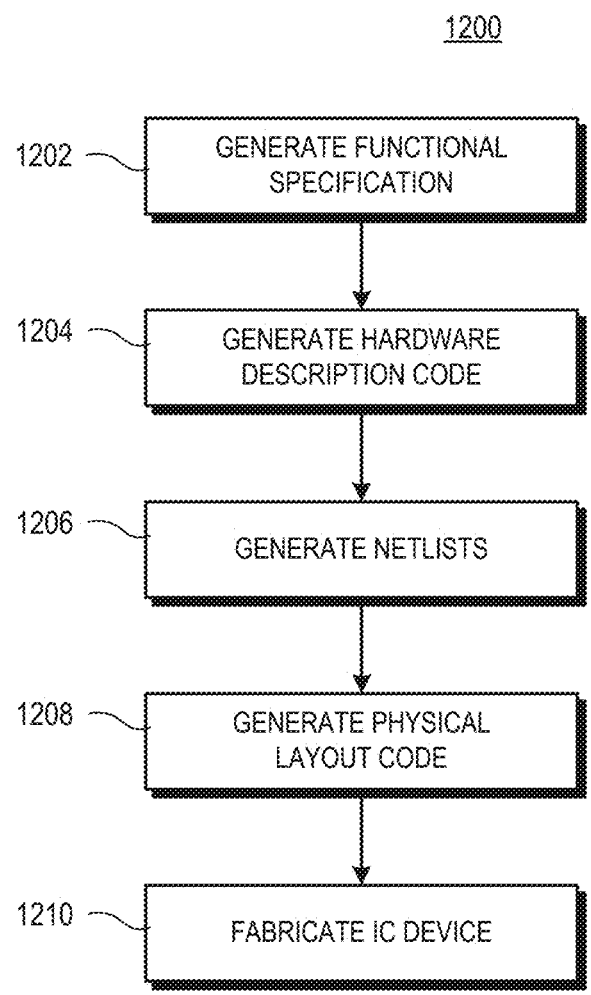
FIG. 13 is a flow diagram illustrating a method for designing and fabricating an integrated circuit (IC) device in accordance with some embodiments.

FIG. 13 is a flow diagram illustrating an example method 1300 for the design and fabrication of an IC device implementing one or more aspects of the disclosed embodiments. As noted above, the code generated for each of the following processes is stored or otherwise embodied in computer readable storage media for access and use by the corresponding design tool or fabrication tool.

At block 1302 a functional specification for the IC device is generated. The functional specification (often referred to as a micro architecture specification (MAS)) may be represented by any of a variety of programming languages or modeling languages, including C, C++, SystemC, Simulink (TM), or MATLAB (TM).

At block 1304, the functional specification is used to generate hardware description code representative of the hardware of the IC device. In at some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1306 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1308, one or more EDA tools use the netlists produced at block 1306 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1310, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining whether a virtual address of a write command received at a node of a compute server is mapped to a physical address based on a translation table stored in a cache of the compute server;
   in response to a determination that the virtual address is not mapped to a physical address, obtaining an available physical address from a free list stored in the cache of the compute server;
   mapping the virtual address to the obtained available physical address;
   writing data of the write command to a physical storage device at the obtained physical address;
   creating a copy of the updated translation table and free list; and
   storing the copy to a physical storage device associated with the compute server.

2. The method of claim 1, further comprising:
   updating the cached translation table and free list to reflect the mapping.

3. The method of claim 1, further comprising:
   in response to a determination that the virtual address is mapped to a physical address, writing the data to the physical storage device at the mapped physical address.

4. The method of claim 1, further comprising:
   writing metadata comprising the virtual address to the obtained physical address.

5. The method of claim 1, further comprising:
   receiving a read command at the node, the read command comprising a virtual address; and
   in response to a determination that the virtual address is mapped to a physical address, retrieving data stored at the physical address.

6. The method of claim 5, further comprising:
   in response to a determination that the virtual address is not mapped to a physical address, returning zero data for the read command.

7. The method of claim 1, wherein:
   the node comprises a first node implemented at a first circuit board of the compute server; and
   the physical storage device is implemented at a second circuit board of a second node of the compute server, the second circuit board separate from the first circuit board.

8. A system comprising:
   a central processing unit operably coupleable to a memory comprising a cache;
   a plurality of controllers in operable communication with the central processing unit and a plurality of physical storage devices;
   a translation table stored at the cache;
   a free list stored at the cache; and
   at least one physical table and a copy of each of the translation table and the free list stored on at least one of the physical storage devices.

9. The system of claim 8, wherein the translation table comprises mappings of virtual addresses to physical addresses.

10. The system of claim 8, wherein the physical table comprises blocks of data, each block having a physical address.

11. The system of claim 8, wherein the physical table comprises metadata containing virtual addresses.

12. The system of claim 8, wherein:
   the central processing unit and the plurality of controllers are implemented at first circuit board of a first node of a compute server; and
   the physical storage device is implemented at second circuit board of a second node of the compute server, the second circuit board separate from the first circuit board.

13. A method comprising:
   caching a translation table and a free list to a cache of a compute server;
   generating a copy of the cached translation table and free list; and
   storing the copy to a physical storage device in operable communication with the compute server.

14. The method of claim 13, wherein creating the copy of the cached translation table and free list is atomic.

15. The method of claim 13, wherein creating the copy of the cached translation table and free list and storing the copy to a physical storage device occurs prior to power shutdown of the compute server.

16. The method of claim 13, wherein generating the copy of the translation table and free list comprises periodically generating the copy while the compute server is powered on.

17. The method of claim 13, further comprising:
   building the cached translation table and free list from the copy stored at the physical storage device in response to a boot of the compute server.

18. The method of claim 17, further comprising:
   repairing the cached translation table utilizing the free list and a physical table, the physical table comprising metadata containing a virtual address for each physical address that is mapped to a virtual address.

19. The method of claim 18, wherein repairing the cached translation table further comprises:
  comparing the free list to the physical table to determine whether a physical address from the free list contains virtual address metadata in the physical table; and
  in response to a determination that the physical address from the free list does contain metadata of a virtual address, updating the cached translation table to reflect mapping of the physical address to the virtual address and removing the physical address from the free list.

20. The method of claim 19, further comprising:
  in response to a determination that the physical address from the free list does not contain metadata of a virtual address, ceasing repair of the cached translation table.

\* \* \* \* \*